US012561577B2

(12) United States Patent
Jain et al.

(10) Patent No.: US 12,561,577 B2
(45) Date of Patent: Feb. 24, 2026

(54) AUTOMATIC FILTER SELECTION IN DECISION TREE FOR MACHINE LEARNING CORE

(71) Applicant: STMicroelectronics, Inc., Coppell, TX (US)

(72) Inventors: Mahaveer Jain, Santa Clara, CA (US); Mahesh Chowdhary, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 1201 days.

(21) Appl. No.: 17/085,593

(22) Filed: Oct. 30, 2020

(65) Prior Publication Data

US 2022/0138589 A1 May 5, 2022

(51) Int. Cl.
*G06N 5/01* (2023.01)
*G06N 20/00* (2019.01)

(52) U.S. Cl.
CPC ............... *G06N 5/01* (2023.01); *G06N 20/00* (2019.01)

(58) Field of Classification Search
CPC ................................. G06N 5/01; G06N 20/00
See application file for complete search history.

(56) References Cited

U.S. PATENT DOCUMENTS

| | | | |
|---|---|---|---|
| 7,093,492 | B2 | 8/2006 | Treiber et al. |
| 9,186,079 | B2 | 11/2015 | Mase et al. |
| 9,679,093 | B2 | 6/2017 | Kulathumani et al. |
| 9,918,646 | B2 | 3/2018 | Singh Alvarado et al. |

| | | | |
|---|---|---|---|
| 10,022,071 | B2 | 7/2018 | Rishi et al. |
| 10,142,789 | B2 | 11/2018 | Chowdhary et al. |
| 10,260,877 | B2 | 4/2019 | Chowdhary et al. |
| 10,360,510 | B1 * | 7/2019 | Al-Amin ............ A63B 24/0062 |

(Continued)

FOREIGN PATENT DOCUMENTS

| | | |
|---|---|---|
| EP | 3511902 A1 | 7/2019 |
| RU | 2702980 C1 | 10/2019 |

OTHER PUBLICATIONS

U.S. Appl. No. 16/728,822, filed Dec. 27, 2019, entitled "Method and System for Generating Machine Learning Based Classifiers for Reconfigurable Sensor" (unpublished).

*Primary Examiner* — Alexey Shmatov
*Assistant Examiner* — Devika S Maharaj
(74) *Attorney, Agent, or Firm* — Seed Intellectual Property Law Group LLP

(57) ABSTRACT

Technological advancements are disclosed that utilize inertial sensor data for multiple classes to select a combination of filters to extract information though features to train a machine learning core decision tree. A determination is made whether the data for a class includes a frequency peak or dominating frequency that contains significant information about the class. In response to the data for the class including a frequency peak, a peak-based frequency range is determined. An entropy value is calculated for multiple frequency ranges in the data for the class. An entropy-based frequency range is selected from the multiple frequency ranges having a minimum entropy value. A frequency of interest is selected from the peak-based frequency range and the entropy-based frequency range for the class. A combination of filters is selected for each frequency of interest for each class and a decision tree is trained based on selected filter combination.

21 Claims, 11 Drawing Sheets

(56)                    References Cited

U.S. PATENT DOCUMENTS

| | | |
|---|---|---|
| 10,452,994 B2 | 10/2019 | Duesterwald et al. |
| 2013/0085711 A1* | 4/2013 | Modi .................... G01C 22/006 |
| | | 702/141 |
| 2016/0110657 A1 | 4/2016 | Gibiansky et al. |
| 2016/0291552 A1 | 10/2016 | Pal et al. |
| 2018/0285767 A1 | 10/2018 | Chew |
| 2019/0121350 A1 | 4/2019 | Cella et al. |
| 2020/0388397 A1* | 12/2020 | Shoaran ............... A61B 5/7264 |

* cited by examiner

AUTOMATIC FILTER SELECTION IN DECISION TREE FOR MACHINE LEARNING CORE

BACKGROUND

Technical Field

The present disclosure generally relates to electronic devices and, more specifically, to electronic devices employing inertial sensors to determine movement activities of the electronic device.

Description of the Related Art

Many mobile electronic devices, such as smartphones, include one or more inertial sensors to detect movement of the electronic device. The inertial data obtained from the inertial sensors can be used to rotate the display screen, control application functionality (e.g., control a character in a video game application, or detect fitness activity), "wake up" the device, etc. The inertial data can also be used to determine one or more movement activities of the user while the user is holding/wearing the electronic device. For example, the inertial data can be used to determine if the user is stationary (not moving), walking, or running. This type of movement activity can be determined based on the characteristics of the inertial data, such as the frequency and amplitude of specific inertial data. Such movement activity determinations can be used to improve interactions between the user and electronic device.

Typically, a decision tree and finite state machine can be utilized to identify the activity from the inertial data. With decision trees, signals can be represented with a set of features (e.g., mean, variance, energy, frequency response) that contain information about the motion of the device containing the inertial sensors. Extracting signals with a specific frequency can be done by applying filters after analyzing the signal. Establishing these filters, cut-off frequency, and features to develop the decision trees is generally a manual process and can be difficult for individuals to use. For example, the walking gait of one person may be different from the walking gait of another person. Therefore, different filters may be used to improve the accuracy in detecting when different people are walking. It is with respect to these and other considerations that the embodiments described herein have been made.

BRIEF SUMMARY

A computing device may be summarized as including a memory that stores computer instructions and at least one processor that, when executing the computer instructions, causes the computing device to perform actions. Sensor data is obtained for a plurality of classes. For each corresponding class of the plurality of classes: it is determined if the sensor data for the corresponding class includes at least one frequency peak; in response to the sensor data for the corresponding class including at least one frequency peak, at least one peak-based frequency range associated with the at least one frequency peak is determined; an entropy value is calculated for a plurality of frequency ranges in the sensor data for the corresponding class; at least one entropy-based frequency range is selected from the plurality of frequency ranges having a minimum entropy value; and at least one frequency of interest is selected from the at least one peak-based frequency range and the at least one entropy-based frequency range for the corresponding class. A combination of one or more filters for each frequency of interest for each of the plurality of classes is then selected and a decision tree is trained for selecting a class from among the plurality of classes for input sensor data based on features associated with the selected combination of filters.

Execution of the computer instructions by the at least one processor to determine the at least one peak-based frequency range may further cause the computing device to: determine if a first peak-based frequency range for a first class in the plurality of classes overlaps a second peak-based frequency range for a second class in the plurality of classes. And in response to the first peak-based frequency range satisfying a non-overlapping threshold with the second peak-based frequency range: the first peak-based frequency range is set as a first frequency of interest for the first class; and the second peak-based frequency range is set as a second frequency of interest for the second class.

Execution of the computer instructions by the at least one processor to calculate the entropy value for the plurality of frequency ranges in the sensor data for the corresponding class may further cause the computing device to calculate the entropy value for all combinations of frequency bands in the sensor data for the corresponding class.

Execution of the computer instructions by the at least one processor to calculate the entropy value for all combinations of frequency bands in the sensor data for the corresponding class may further cause the computing device to determine if the entropy value of a current frequency band is less than the entropy value of a previous frequency band. In response to the entropy value of the current frequency band being less than the entropy value of the previous frequency band, a width of a next frequency band is set to twice the width of the current frequency band; and in response to the entropy value of the current frequency band being more than the entropy value of the previous frequency band, a width of a next frequency band is set to three-fourths the width of the current frequency band.

Execution of the computer instructions by the at least one processor to select the combination of one or more filters for each frequency of interest for each of the plurality of classes may further cause the computing device to test multiple combinations of filters for each frequency of interest for each of the plurality of classes.

Execution of the computer instructions by the at least one processor to select the combination of one or more filters for different frequencies of interest for each of the plurality of classes may further cause the computing device to select the combination of one or more filters that maximizes accuracy of the decision tree.

Execution of the computer instructions by the at least one processor may further cause the computing device to select a frequency of interest for each of the plurality of classes that satisfies a non-overlapping threshold of frequencies of interest for other classes.

A method performed by at least one processor may be summarized as the following. Sensor data is obtained for a plurality of classes and multiple actions are performed for each corresponding class of the plurality of classes. It is determined if the sensor data for the corresponding class includes at least one frequency peak. In response to the sensor data for the corresponding class including at least one frequency peak, at least one peak-based frequency range associated with the at least one frequency peak is determined. An entropy value for a plurality of frequency ranges in the sensor data is calculated for the corresponding class. At least one entropy-based frequency range is selected from the plurality of frequency ranges having a minimum entropy value. And at least one frequency of interest is selected from the at least one peak-based frequency range and the at least one entropy-based frequency range for the corresponding class. A combination of one or more filters for frequencies of interest is then selected for each of the plurality of classes and a decision tree is trained for selecting a class from among the plurality of classes for input sensor data based on signal features using the selected combination of filters.

Determining the at least one peak-based frequency range may further include determining if a first peak-based frequency range for a first class in the plurality of classes overlaps a second peak-based frequency range for a second class in the plurality of classes. In response to the first peak-based frequency range satisfying a non-overlapping threshold with the second peak-based frequency range, the first peak-based frequency range is set as a first frequency of interest for the first class and the second peak-based frequency range is set as a second frequency of interest for the second class.

Calculating the entropy value for the plurality of frequency ranges in the sensor data for the corresponding class may further include calculating the entropy value for all combinations of frequency bands in the sensor data for the corresponding class.

Calculating the entropy value for all combinations of frequency bands in the sensor data for the corresponding class may further include determining if the entropy value of a current frequency band is less than the entropy value of a previous frequency band. In response to the entropy value of the current frequency band being less than the entropy value of the previous frequency band, a width of a next frequency band is set to twice the width of the current frequency band. And in response to the entropy value of the current frequency band being more than the entropy value of the previous frequency band, a width of a next frequency band is set to three-fourths the width of the current frequency band.

Selecting the combination of one or more filters for each frequency of interest for each of the plurality of classes may further include testing multiple combinations of filters for each frequency of interest for each of the plurality of classes.

Selecting the combination of one or more filters for each frequency of interest for each of the plurality of classes may further include selecting the combination of one or more filters that maximizes accuracy of the decision tree.

The method may further include selecting a frequency of interest for each of the plurality of classes that satisfies a non-overlapping threshold of frequencies of interest for other classes.

A system may be summarized as including a memory that stores labeled sensor data and computer instructions and including one or more processors, which in operation, execute the computer instructions to perform the following actions. Sensor data is obtained for a plurality of classes. For each corresponding class of the plurality of classes: it is determined if the sensor data for the corresponding class includes at least one frequency peak or dominating frequency. In response to the sensor data for the corresponding class including at least one frequency peak, at least one peak-based frequency range associated with the at least one frequency peak is determined. An entropy value is calculated for a plurality of frequency ranges in the sensor data for the corresponding class and at least one entropy-based frequency range is selected from the plurality of frequency ranges having a minimum entropy value. At least one frequency of interest is selected from the at least one peak-based frequency range and the at least one entropy-based frequency range for the corresponding class. A combination of one or more filters is then selected for each frequency of interest for each of the plurality of classes and a decision tree is trained for selecting a class from among the plurality of classes for input sensor data based on the selected combination of filters.

The one or more processors, in operation, may determine the at least one peak-based frequency range by executing the computer instruction further to determine if a first peak-based frequency range for a first class in the plurality of classes overlaps a second peak-based frequency range for a second class in the plurality of classes. In response to the first peak-based frequency range satisfying a non-overlapping threshold with the second peak-based frequency range, the first peak-based frequency range is set as a first frequency of interest for the first class and the second peak-based frequency range is set as a second frequency of interest for the second class.

The one or more processors, in operation, may calculate the entropy value for the plurality of frequency ranges in the sensor data for the corresponding class by executing the computer instructions further to calculate the entropy value for all combinations of frequency bands in the sensor data for the corresponding class.

The one or more processors, in operation, may calculate the entropy value for all combinations of frequency bands in the sensor data for the corresponding class by executing the computer instructions further to determine if the entropy value of a current frequency band is less than the entropy value of a previous frequency band. In response to the entropy value of the current frequency band being less than the entropy value of the previous frequency band, a width of a next frequency band is set to twice the width of the current frequency band. And in response to the entropy value of the current frequency band being more than the entropy value of the previous frequency band, a width of a next frequency band is set to three-fourths the width of the current frequency band.

The one or more processors, in operation, may select the combination of one or more filters for each frequency of interest for each of the plurality of classes by executing the computer instructions further to test multiple combinations of filters for each frequency of interest for each of the plurality of classes.

The one or more processors, in operation, may select the combination of one or more filters for each frequency of interest for each of the plurality of classes by executing the computer instructions further to select the combination of one or more filters that maximizes accuracy of the decision tree.

The one or more processors, in operation, may execute the computer instructions further to download settings of the select combination of one or more filters into a sensor with a machine learning core.

The one or more processors, in operation, may execute the computer instructions further to store the trained decision tree onto a sensor with a machine learning core.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

In the following description, along with the accompanying drawings, certain details are set forth in order to provide a thorough understanding of various embodiments of devices, systems, methods, and articles. One of skill in the art, however, will understand that other embodiments may be practiced without these details. In other instances, well-known structures and methods associated with, for example, circuits, such as transistors, multipliers, adders, dividers, comparators, integrated circuits, logic gates, finite state machines, accelerometers, gyroscopes, magnetic field sensors, memories, bus systems, etc., have not been shown or described in in detail in some figures to avoid unnecessarily obscuring descriptions of the embodiments. Moreover, well-known structures or components that are associated with the environment of the present disclosure, including but not limited to the communication systems and networks, have not been shown or described in order to avoid unnecessarily obscuring descriptions of the embodiments.

Unless the context requires otherwise, throughout the specification and claims that follow, the word "comprise" and variations thereof, such as "comprising," and "comprises," are to be construed in an open, inclusive sense, that is, as "including, but not limited to."

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context clearly dictates otherwise. In addition, throughout the specification, the meaning of "a," "an," and "the" include singular and plural references. Furthermore, the particular features, structures, or characteristics may be combined in any suitable manner in one or more embodiments to obtain further embodiments.

Figure 1:
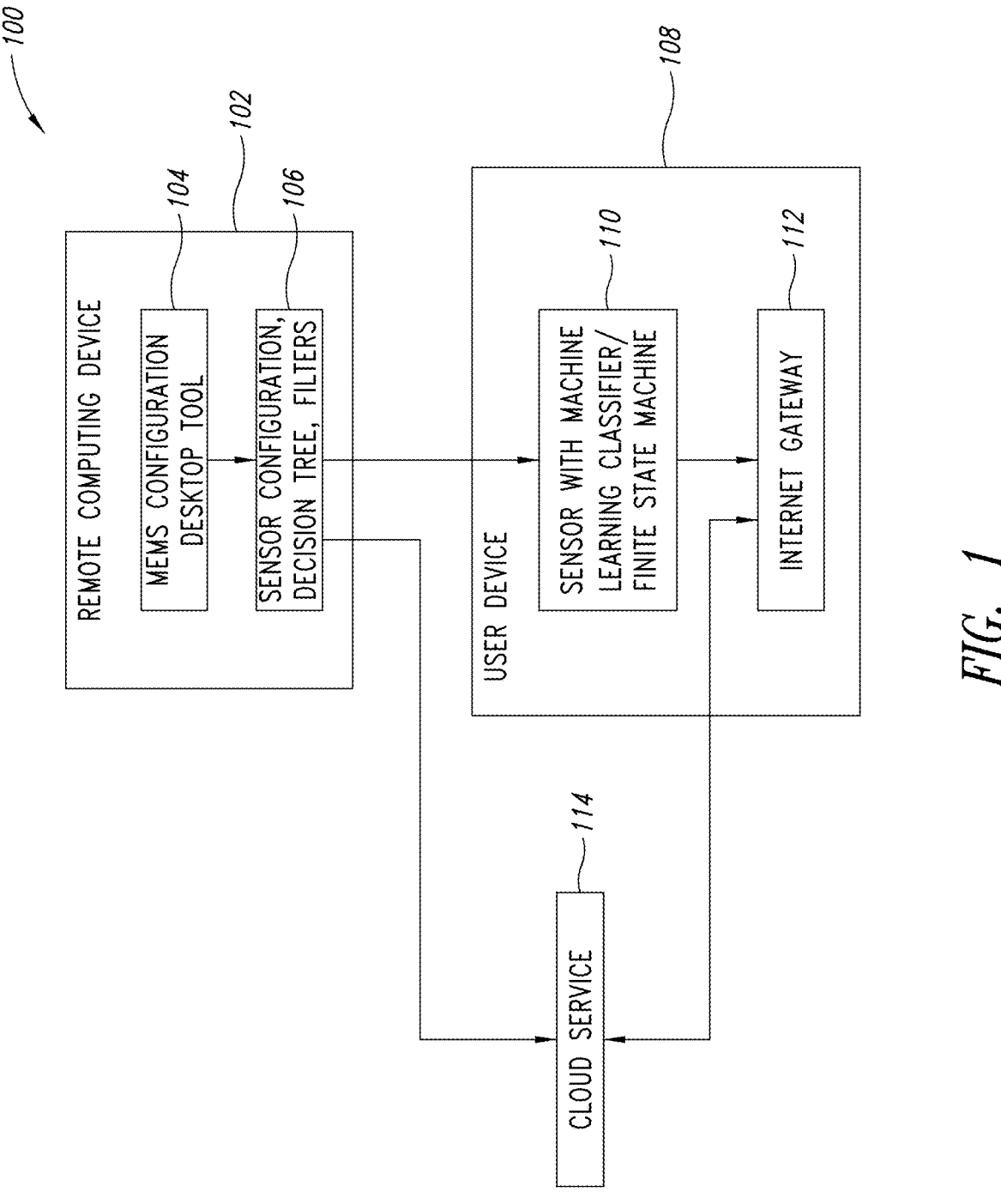
FIG. 1 illustrates a context diagram of an environment for automating filter selection in a decision tree for a machine learning core in accordance with embodiments described herein.

FIG. 1 illustrates a context diagram of an environment 100 for automating filter selection in a decision tree for a machine learning core in accordance with embodiments described herein. Environment 100 may include a remote computing device 102, a user device 108, and a cloud service 114.

The user device 108 includes a sensor 110 with a machine learning core (not separately illustrated). This machine learning core may be a classifier that uses a decision tree to determine a state of the user device 108. One example output of the sensor 110 may be whether the user of the user device 108 is walking, fast walking, running, biking, or stationary. The sensor 110 is a MEMS (micro-electro-mechanical system) or similar sensor that includes or is electrically coupled to an accelerometer, a gyroscope, or other inertial sensor, or some combination thereof. The sensor 110 is configured to receive configuration data as input to initialize or reconfigure the decision tree used by the machine learning core. The sensor 110 acquires sensor data from the inertial sensors, and processes the sensor data using the decision tree to generate a context of the user device 108 relative to its surroundings. In some embodiments, this configuration data is the decision tree itself. In other embodiments, the configuration data may identify a number of filters, the filter types, and the cutoff frequencies of the filters, or other features of the filters (such as mean, variance, energy, peak to peak), in which to train the decision tree. The user device 108 may also include an internet gateway 112 to communicate with the cloud service 114, or to communicate with the remote computing device 102.

The cloud service 114 may store configuration data for different user devices 108, for different users of a single user device 108, or for different operating conditions of the user device 108, or some combination thereof. Accordingly, specific configuration data stored on the cloud service 114 can be selected based on the user device, the user of the user device, or operating conditions of the user device, or some combination thereof. The cloud service 114 can provide this specific configuration data to the user device 108 via the internet gateway 112. The sensor 110 can then reconfigure itself based on this specific configuration data. As mentioned above, the confirmation data may be a decision tree or filter information that is used to train a decision tree.

The remote computing device 102 includes a MEMS confirmation desktop tool 104 and sensor configuration, decision tree, filters module or circuit 106 for sensor configuration, decision tree training, feature selection, and filter selection. The MEMS conformation desktop tool 104 provides a graphical user interface to a user to provide one or more inputs, variables, or parameters that the remote computing device 102 can use in generating the configuration data for the sensor 110 on the user device 108. Examples of such parameters may include, but are not limited to, number of decision trees, output rate of the inertial sensors on the sensor 110, type of sensor 110, types of inertial sensor input, labeled sensor data for training, etc. The module 106 may employ embodiments described herein to determine the configuration data for the sensor 110. The module 106 downloads or provides the configuration data to the sensor 110 via a wired or wireless communication connection or network (not illustrated), such as Wi-Fi, Bluetooth, etc. The module 106 may also provide the configuration data to the cloud service 114 for storage or for further processing.

Although FIG. 1 shows the remote computing device 102 as being separate from the user device 108, embodiments are not so limited. In some embodiments, the remote computing device 102 and the user device 108 may be a single computing device, they may be embedded within a same computing device, or the user device 108 may be embedded within the remote computing device 102. For example, the remote computing device 102 may be a smartphone, tablet computer, or other user computing device and the user device 108 may be sensor chip within in the remote computing device 102.

Figure 2:
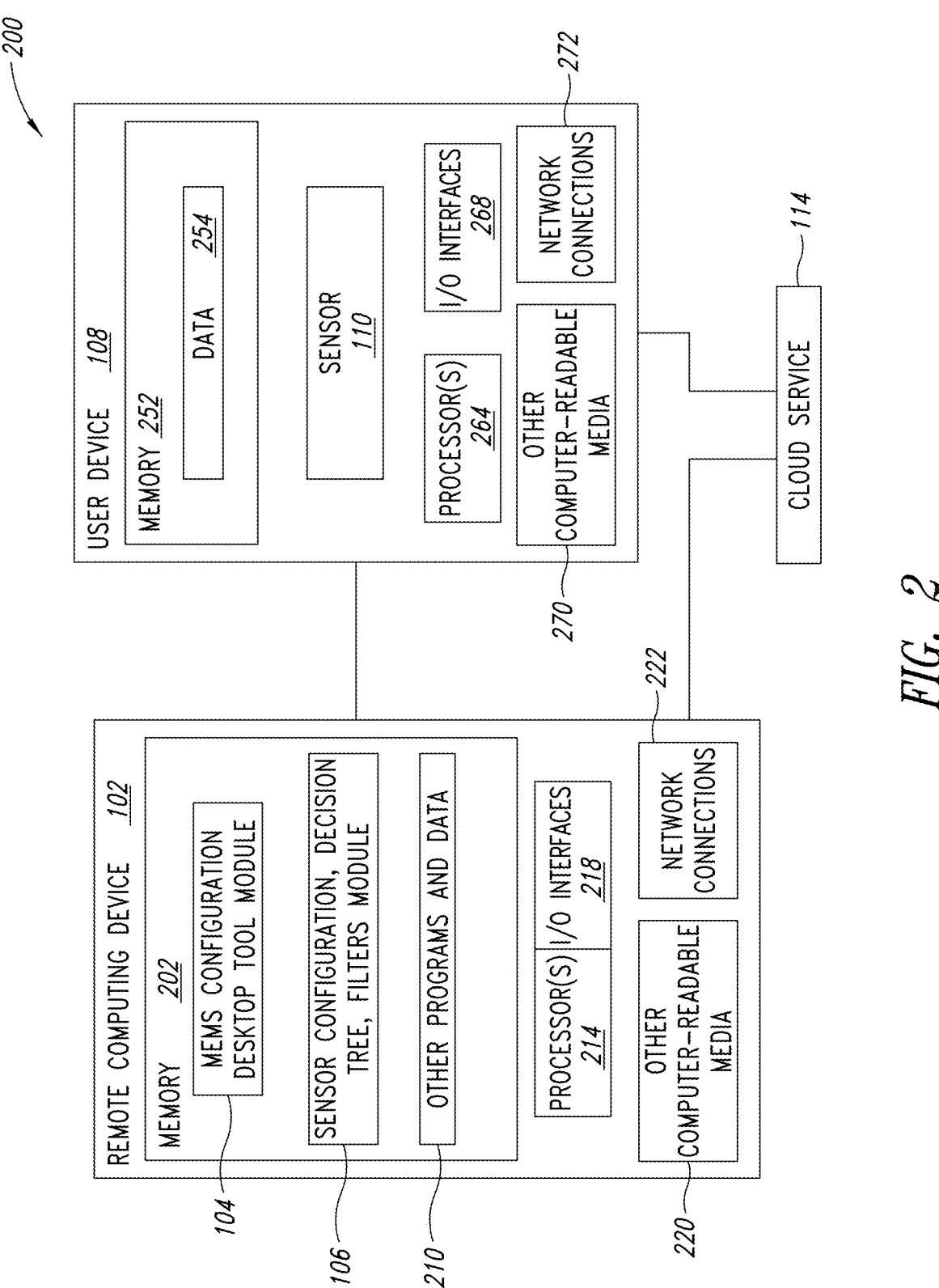
FIG. 2 shows computing systems for implementing embodiments of the environment in FIG. 1.

FIG. 2 shows computing systems for implementing embodiments of the environment in FIG. 1. System 500 includes a remote computing device, a user device 108, and a cloud service 114. In various embodiments, the cloud service 114 may be optional and may not be utilized.

Remote computing device 102 utilizes labeled sensor data for a plurality of classes in a peak method and entropy method to generate one or more frequencies of interest for each of the plurality of classes. A plurality of combinations of filter configurations may be employed for each frequency of interest to select a most accurate or optimized decision tree, as described herein. One or more special-purpose computing systems may be used to implement remote computing device 102. Accordingly, various embodiments described herein may be implemented in software, hardware, firmware, or in some combination thereof. Remote computing device 102 may include memory 202, one or more processors 214, I/O interfaces 218, other computer-readable media 220, and network connections 222.

Memory 202 may include one or more various types of non-volatile and/or volatile storage technologies. Examples of memory 202 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 202 may be utilized to store information, including computer-readable instructions that are utilized by processor 214 to perform actions, including embodiments described herein.

Memory 202 may have stored thereon MEMS configuration desktop tool 104 and sensor configuration, decision tree, filters module 106. The MEMS configuration desktop tool 104 is configured to present a graphical user interface to a user to receive various parameter inputs from the user. The sensor configuration, decision tree, filters module 106 is configured to generate configuration data for sensor 110 on user device 108 in accordance with embodiments described herein. Memory 202 may also store other programs and data 210, which may include labeled sensor data, operating characteristics of the sensor 110, filter information, etc.

Network connections 222 are configured to communicate with the user device 108 to provide or download the configuration data to the user device for reconfiguring the sensor 110. In various embodiments, the network connections 222 include transmitters and receivers (not illustrated) to send and receive data as described herein. I/O interfaces 218 may include a keyboard, audio interfaces, video interfaces, or the like. Other computer-readable media 220 may include other types of stationary or removable computer-readable media, such as removable flash drives, external hard drives, or the like.

User device 108 receives configuration data from the remote computing device 102 for reconfiguring the sensor 110. One or more special-purpose computing systems may be used to implement user device 108. Accordingly, various embodiments described herein may be implemented in software, hardware, firmware, or in some combination thereof. User device 108 may include memory 252, one or more processors 264, I/O interfaces 268, other computer-readable media 270, and network connections 272.

Memory 252 may include one or more various types of non-volatile and/or volatile storage technologies similar to memory 202. Memory 252 may be utilized to store information, including computer-readable instructions that are utilized by processor 270 to perform actions, including some embodiments described herein. Memory 252 may have stored thereon data 254, which may include the configuration data, sensor data, or other information.

Network connections 272 are configured to communicate with the remote computing device 102 to receive the configuration data for the sensor 110 or to communication with the cloud service 114. In various embodiments, the network connections 272 include transmitters and receivers (not illustrated) to send and receive data as described herein. I/O interfaces 272 may include audio interfaces, video interfaces, or the like. Other computer-readable media 270 may include other types of stationary or removable computer-readable media, such as removable flash drives, external hard drives, or the like.

Cloud service 114 stores configuration data for one or more user devices 108, one or more users of user devices 108, different operating conditions, or some combination thereof. One or more special-purpose computing systems may be used to implement cloud service. Accordingly, various embodiments described herein may be implemented in software, hardware, firmware, or in some combination thereof. Cloud service 114 may include memory, one or more processors, I/O interfaces, other computer-readable media, and network connections similar to remote computing device 102, but are not illustrated for ease of discussion.

Figure 3:
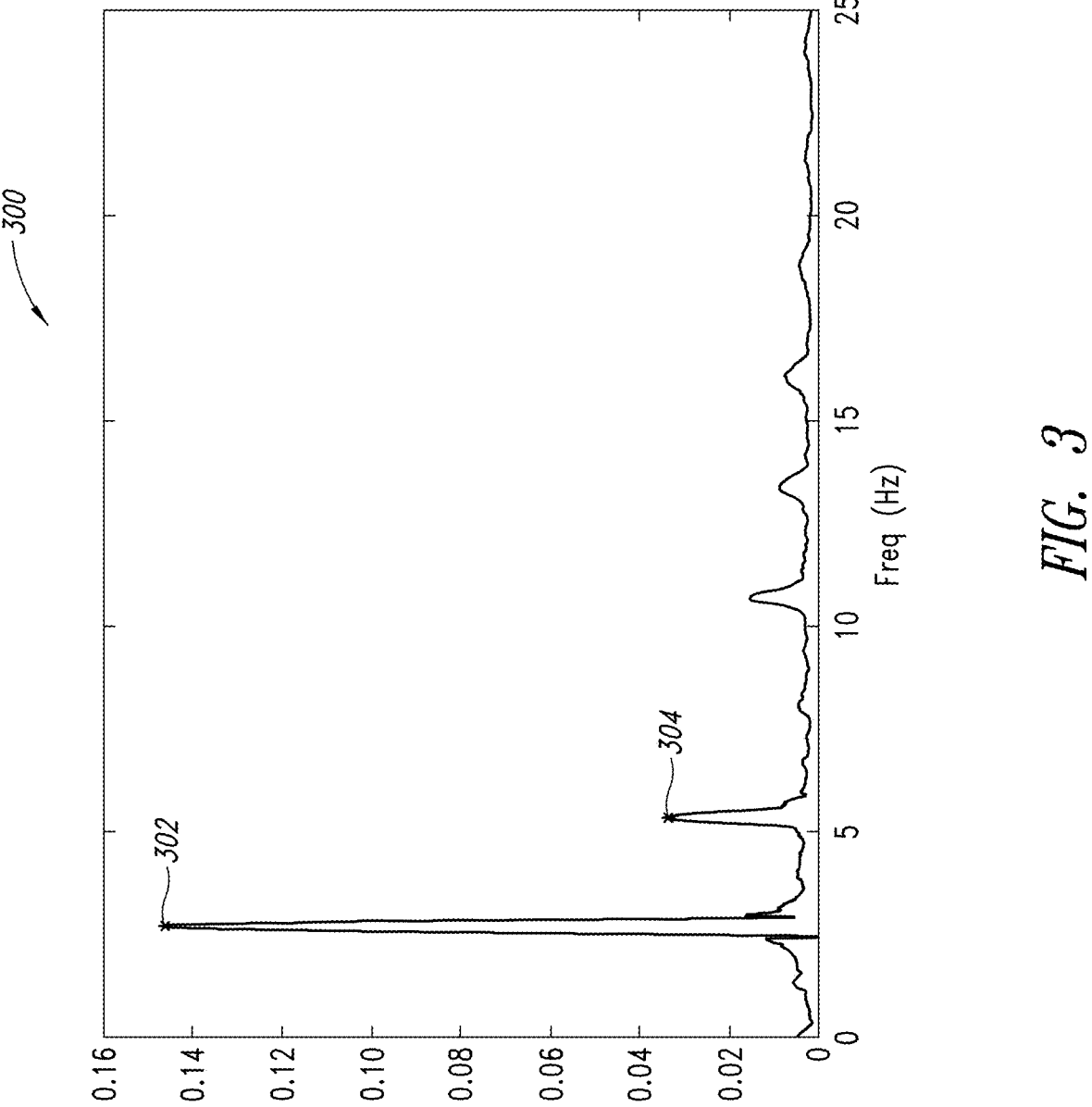
FIGS. 3 and 4 are example graphs illustrating frequency response of inertial data for different classes of human activities.
Figure 4:
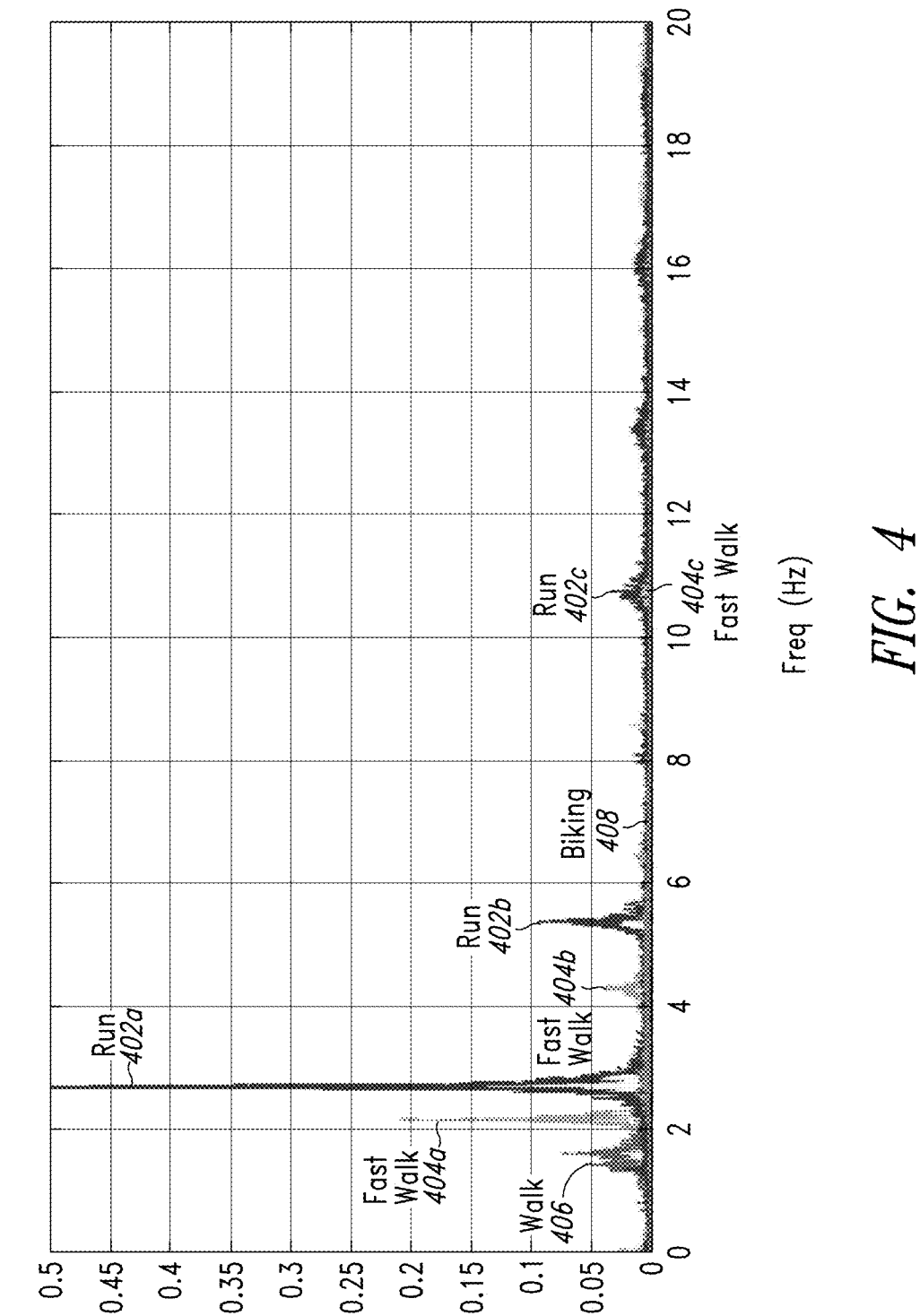

FIGS. 3 and 4 are example graphs illustrating frequency response of inertial data for different classes of activities. FIG. 3 illustrates example frequency response graph 300 with inertial sensor data captured while a person was running. In this example, there are frequency peaks 302 and 304. When isolated from sensor data from other classes, e.g., fast walking, the frequency of these peaks are identifiable. However, when sensor data from other classes are also considered, then it can be difficult to distinguish the classes based solely on the peak values or another signal feature, which is shown in FIG. 4.

FIG. 4 illustrates example graph 400, which overlays sensor data for multiple classes. In this example, the classes include walk, fast walk, run, and biking. As illustrated, the sensor data for each class has different profiles. The walk sensor data includes a frequency peak 406; the fast walk sensor data includes frequency peaks 404*a* and 404*b*; the run sensor data includes frequency peaks 402*a*, 402*b*, and 402*c*; and the biking sensor data is labeled as biking 408, but does not have discernable frequency peaks. As described herein, the peaks of different classes may overlap more than a threshold amount such that the classes are not significantly separate. As a result, a combination of a peak-based method and an entropy-based method may be used to select frequencies of interest for the different classes, which are used to select a combination of filters to train a decision tree.

Figure 5:
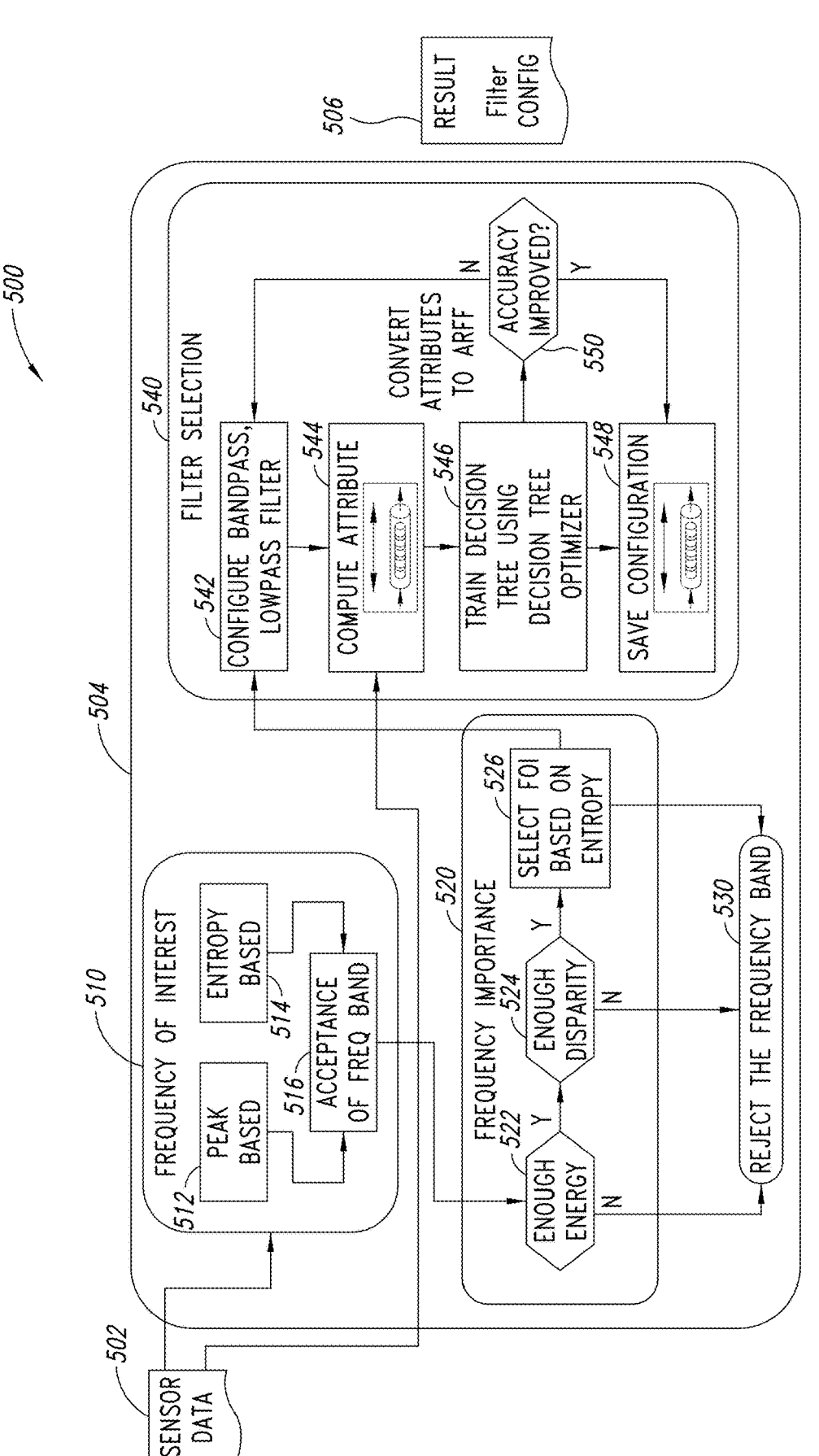
FIG. 5 is a block diagram for automating filter selection in a decision tree for a machine learning core in accordance with embodiments described herein.

FIG. 5 is a block diagram for automating filter selection in a decision tree for a machine learning core in accordance with embodiments described herein. System 500 shows a simplistic illustration of modules employing embodiments described herein and is not limited to the number or types of modules illustrated. Rather, one module or circuit or a plurality of modules or circuits may be utilized to implement the embodiments described herein.

System 500 includes sensor data 502, a training module of circuit 504, and results 506. The sensor data 502 may include inertial data from a one or more inertial sensors for a plurality of known classes. The training module 504 may include a frequency of interest module or circuit 510, a frequency importance module or circuit 520, and a filter selection module or circuit 540.

The frequency of interest module 510 receives the sensor data 502 and determines if there are one or more peaks 512 in each class. As discussed in more detail below, the frequency peaks of different classes are compared to one another to determine if there is a threshold difference between the peaks (amplitude and location) to indicate whether there is sufficient separation between the classes. Frequency ranges are determined for each peak where there is sufficient separation (or lack of frequency overlap) between classes. If there is insufficient separation between classes or no frequency peaks were identified, the frequency of interest module 510 utilizes an entropy-based selection 514. The entropy-based selection 514 determines one or more frequency ranges for one or more classes within the sensor data 502 having a minimum entropy value compared to other frequency ranges within the sensor data 502 for that class. The lower entropy represents the better separation between two signals. The frequency of interest module 510 accepts one or more frequency bands 516 as frequencies of interest for each class based on the peak-based frequency ranges from peaks 512 and the minimum entropy-based frequency ranges from entropy 514.

The frequency importance module 520 determines if each frequency of interest has enough energy 522. The frequency importance module 520 calculates the energy and determines if it satisfies a select threshold. If there is not enough energy for a frequency of interest, then that frequency of interest is rejected 530. The lower energy peaks are rejected because of inherent or external noise may boost the signal for a given test and may not appear in large datasets or real datasets. At least one frequency of interest is maintained for each class. For those frequencies of interest that have enough energy, then the frequency importance module 520 determines if there is enough disparity 524 between the frequencies of interest that can indicate that the classes are sufficiently separate. In various embodiments, the frequencies of interest that have enough energy and do not overlap frequencies of interest from other classes by a threshold amount may indicate that there is enough disparity in those frequencies of interest. The disparity is utilized to separate different classes and if there is no disparity then applying a filter will probably not help to distinguish classes. If there is not enough disparity for one or more frequencies of interest, then those frequencies of interest are rejected 530. For those frequencies of interest that have enough energy and enough disparity, they are selected 526 for filter selection. If all frequencies of interest for a given class are rejected, then the system may output a warning that that class may not be accurately identifiable and may not be considered during the filter selection process.

The filter selection module 540 configures one or more bandpass, low pass, and high pass filters 542 for each selected frequency of interest for each class. The filter selection module 540 utilizes the sensor data 502 and the configured filters 542 to compute attributes 544 to indicate how a decision tree is to be trained. The decision tree can be generated by using various algorithms including, but not limited to, using J48 algorithms, CART (Classification And Regression Tree) algorithms, or entropy-based algorithms. The decision tree learning process mainly involves selecting features with thresholds that can have the best binary split between classes by comparing the feature values against the thresholds. The criteria that distinguishes a best or sufficient binary split varies from algorithm to algorithm. For example, CART may utilize Gini impurity, whereas J48 may utilize information gain as a metrics to split the node. The process of splitting subsequent data continues until it meets the predefine criteria, such as number of remained data points, improvement in accuracy, etc. Each condition of a feature meeting a threshold represents a node in the decision tree. The filter selection module 540 employs the configured filters and attributes 544 to train a decision tree using a decision tree optimizer 546. If the accuracy 550 of the decision tree is greater than a previously stored accuracy, then the trained decision tree configuration is stored 548. Otherwise, a different configuration of filters 542 is selected. The selection of the decision tree may be determined based on one or more criteria (e.g., accuracy, number of connections or nodes in the decision tree compared to the number of connections or nodes in a previous decision tree if both have similar accuracy). After each combination of filters for each frequency of interest is analyzed, the filter selection 540 selects the filter configuration that resulted in the highest accuracy to generate and output the resulting configuration data 506.

Although FIG. 5 illustrates multiple modules or circuits, embodiments are not so limited, and the functionality described herein may be performed by a single module or circuit or by multiple modules or circuits.

Figure 6:
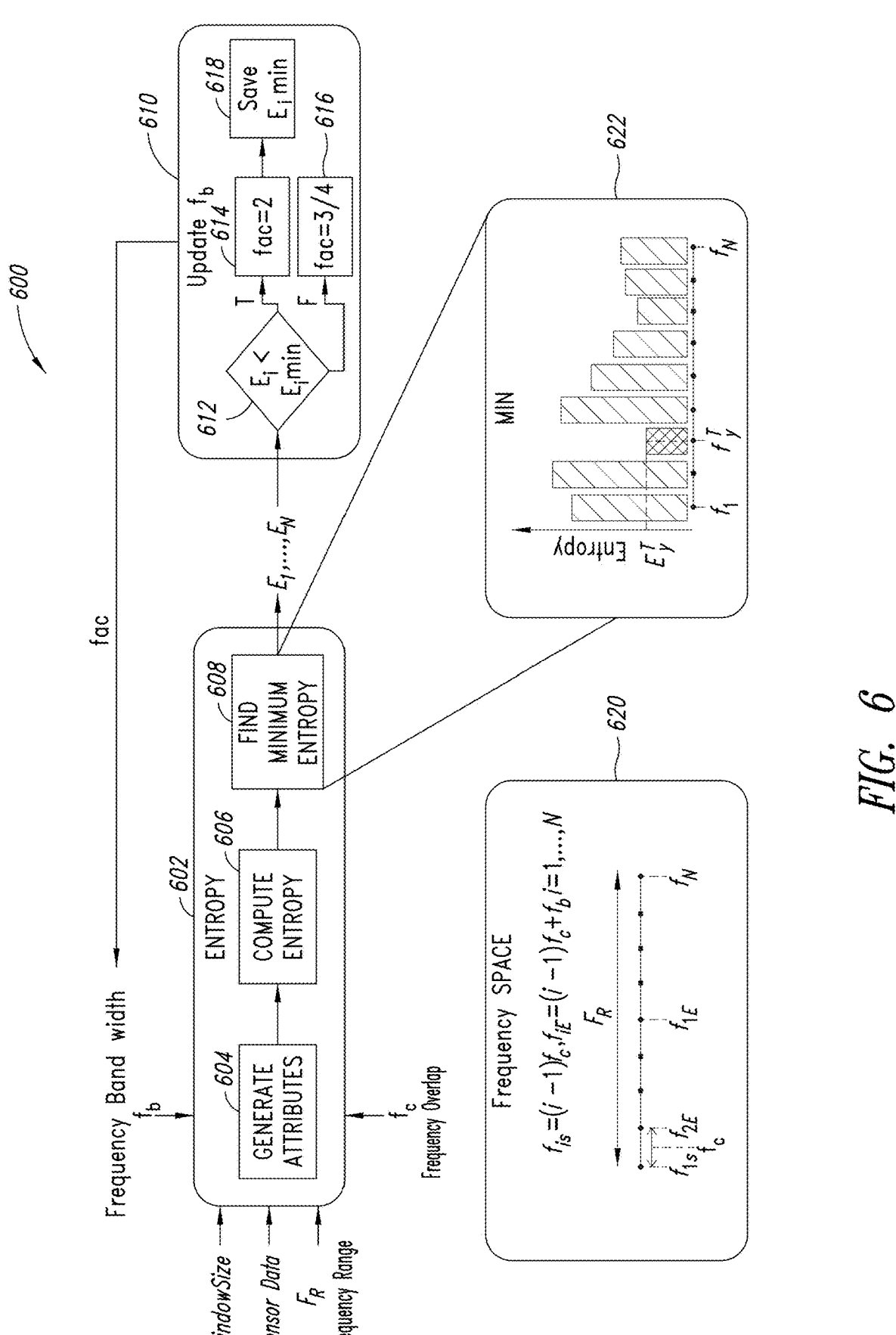
FIG. 6 is a block diagram for selecting frequency of interest for a class using entropy in accordance with embodiments described herein.

FIG. 6 is a block diagram for selecting frequency of interest for a class using entropy in accordance with embodiments described herein. System 600 shows a simplistic illustration of modules employing embodiments described herein and is not limited to the number or types of modules illustrated. Rather, one module or a plurality of modules may be utilized to implement the embodiments described herein.

System 600 includes entropy module or circuit 602 and update module or circuit 610. The entropy module 602 includes an attribute module or circuit 604, an entropy compute module or circuit 606, and minimum entropy module or circuit 608. The attribute module 604 obtains a window size, frequency range, frequency band, a frequency overlap, and the sensor data to generate attributes for computing entropy and determining a minimum entropy. The frequency range of the sensor data is the range from the lowest frequency to the highest frequency in the sensor data. The window size is the initial bandwidth used for selecting an initial frequency band. The frequency overlap is the amount of frequency overlap from one frequency band to the next. Example equation 620 is one example for defining the current frequency band.

The entropy compute module 606 calculates the entropy of the sensor data for the current frequency band.

The minimum entropy module 608 determines if the calculated entropy for the current frequency band is the minimum entropy. The minimum entropy module 608 compares the calculated entropy to a stored the minimum entropy value previously calculated. Graph 622 is an illustrative example of the calculated entropies for multiple frequency bands across the frequency range for a given class.

The update module 610 determines if the calculated entropy is less than a previously stored minimum entropy 612. If it is, then the width of the next frequency band is increased, for example, doubled 614 and the minimum entropy is stored 618. Otherwise, the width of the next frequency band is reduced, for example, to three-fourths of the width of the current frequency band 616. In some embodiments, a starting frequency of the next band can be the same as the starting frequency of the current band, but the ending frequency of the next band is less than the ending frequency of the current band resulting in a bandwidth of the next band being three-fourths of the bandwidth of the current band, to search in a lower and smaller frequency band during the next entropy calculation. The update module 610 provides the updated bandwidth to the entropy module 602 to select the next frequency band based on the updated bandwidth and the other attributes.

Although FIG. 6 illustrates multiple modules or circuits, embodiments are not so limited, and the functionality described herein may be performed by a single module or circuit or by multiple modules or circuits.

Figure 7:
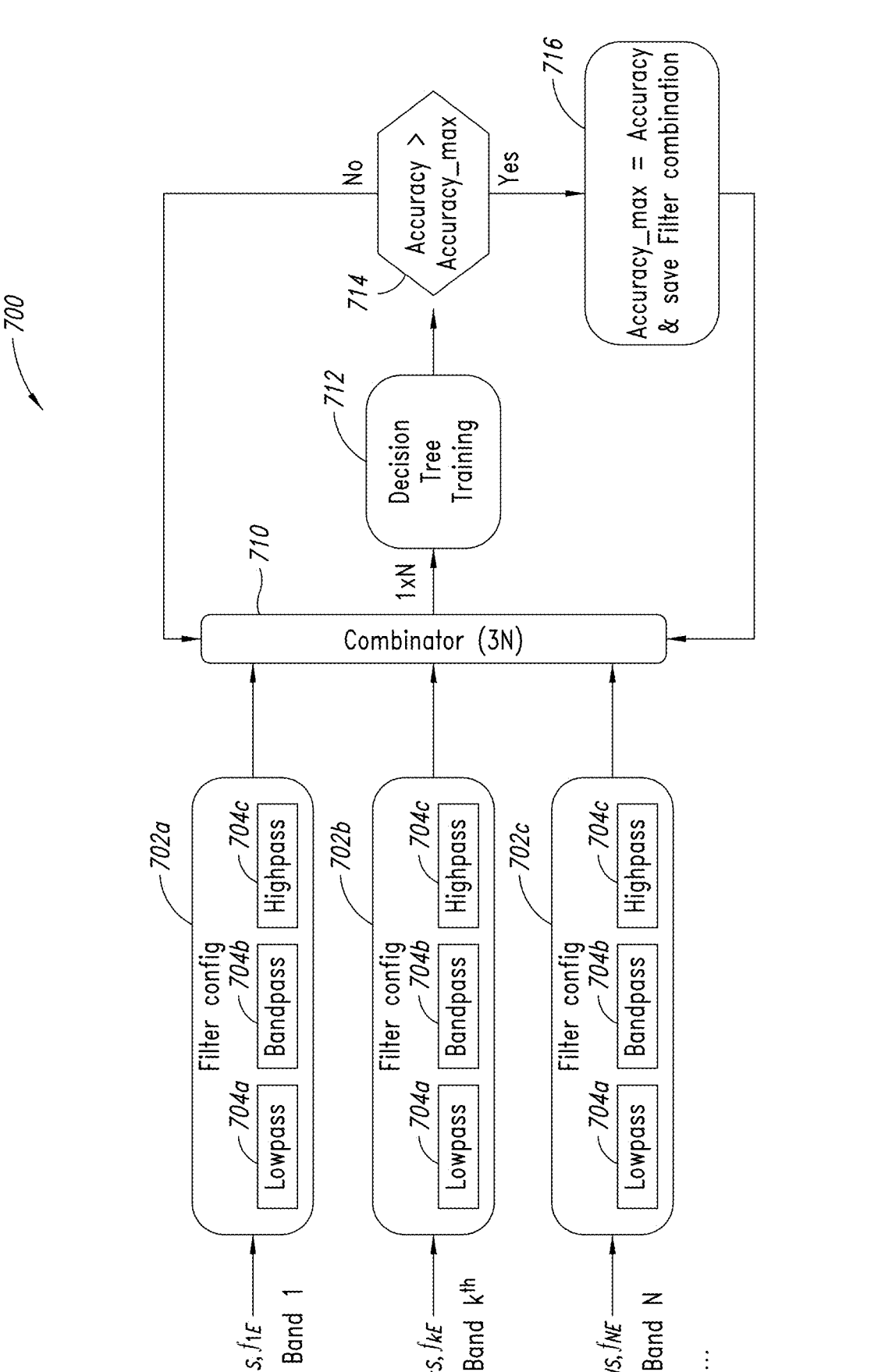
FIG. 7 is a block diagram for selecting filters for frequencies of interest using entropy in accordance with embodiments described herein.

FIG. 7 is a block diagram for selecting types of filters for frequencies of interest using entropy in accordance with embodiments described herein. Filter configurations 702a-702c are selected for each frequency of interest for each class. The filter configurations 702a-702c can include one or more filters 704 selected from a low pass filter 704a, a bandpass filter 704b, or a high pass filter 704c. A combinator 710 combines all of the filters configurations 702 for all frequencies of interest for all classes. The combined filters are then used to train a decision tree 712. The combinator 710 can generate the filter configuration, which can then be optimized (smaller size of decision tree).

The accuracy results of the decision tree training, along with size of decision tree (number on nodes) are used to select the optimum decision tree. In some embodiments, the selection of the optimum decision tree is determined based on the accuracy computed on separate test data using the trained decision tree. In other embodiments, the number of the nodes (e.g., where fewer nodes is preferred as being a more optimized decision tree) and connections (e.g., where fewer connections is preferred as being a more optimized decision tree), or a combination thereof may be utilized to select the more optimized decision tree. If the accuracy results are greater than a previously calculated accuracy for a previous combination of filters 714, then the current filter combination is stored as the maximum accuracy 716; otherwise, a different combination of filter configurations 702 are selected for each frequency of interest for each class. A plurality of different combinations of filters are analyzed for accuracy to determine a most accurate combination of filters based on the sensor data.

Figure 8:
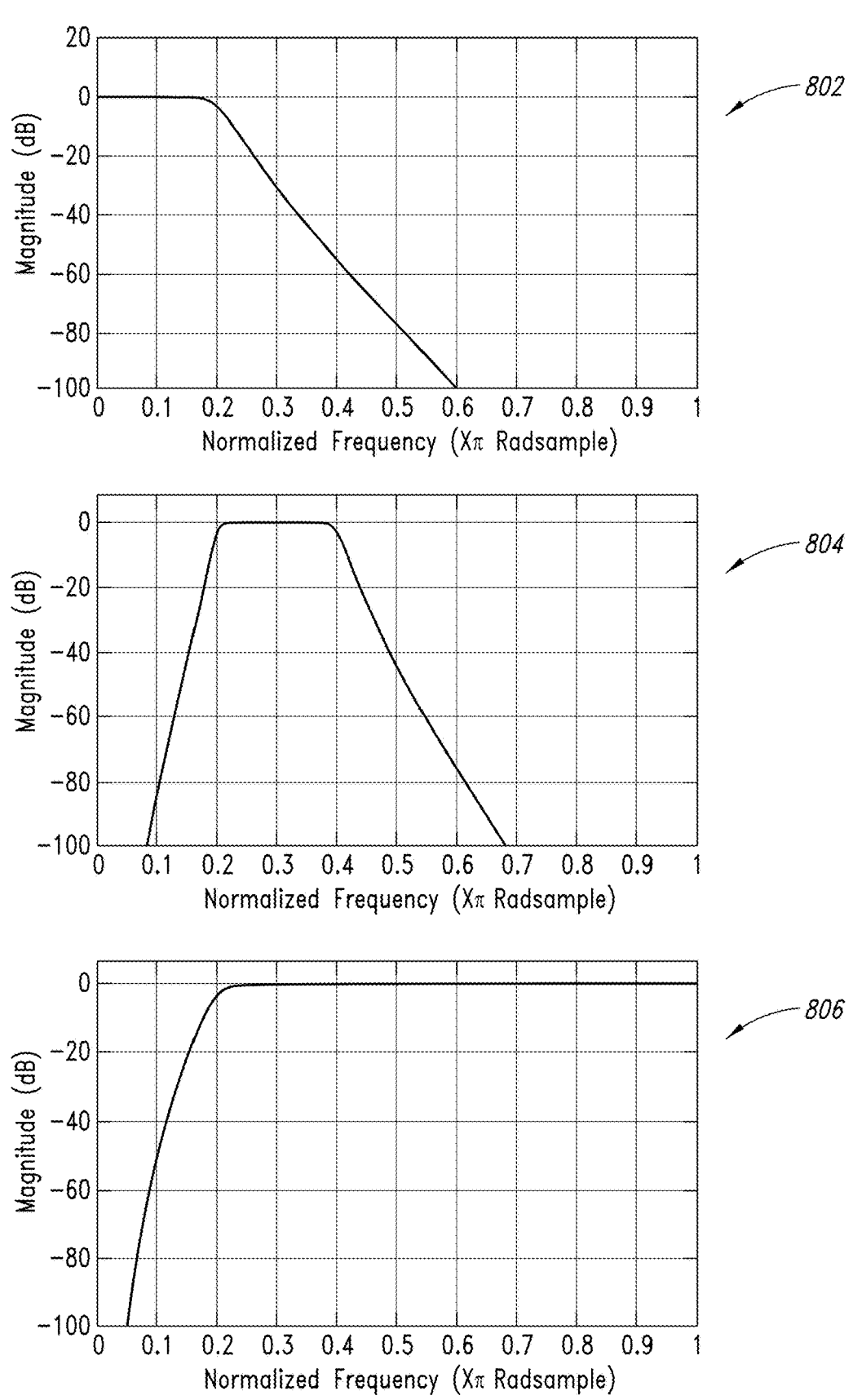
FIG. 8 shows examples of different types of filters.

FIG. 8 shows examples of different types of filters. Briefly, graph 802 represents a low pass filter, graph 804 represents a bandpass filter, and graph 806 represents a high pass filter. The selected frequency of interest of each class can be configured to be one or more of these filters to determine a combination of one or more filters to achieve an optimum performance decision tree. Graph 802 illustrates an example low pass filter for a given frequency of interest $[f_s, f_e]$ with $f_e$ (frequency end) as the cutoff. Graph 804 illustrates an example bandpass filter for a given frequency of interest $[f_s, f_e]$ (frequency start to frequency end). Graph 806 illustrates an example high pass filter for a given frequency of interest $[f_s, f_e]$ with $f_s$ (frequency start) as the cutoff.

The operation of one or more embodiments will now be described with respect to FIGS. 9-11, and for convenience will be described with respect to the embodiments of FIGS. 1-8 described above. In at least one of various embodiments, processes 900, 1000, and 1100 described in conjunction with FIGS. 9, 10, and 11, respectively, may be implemented by or executed on one or more computing devices, such as the remote computing device 102 in FIG. 1.

Figure 9:
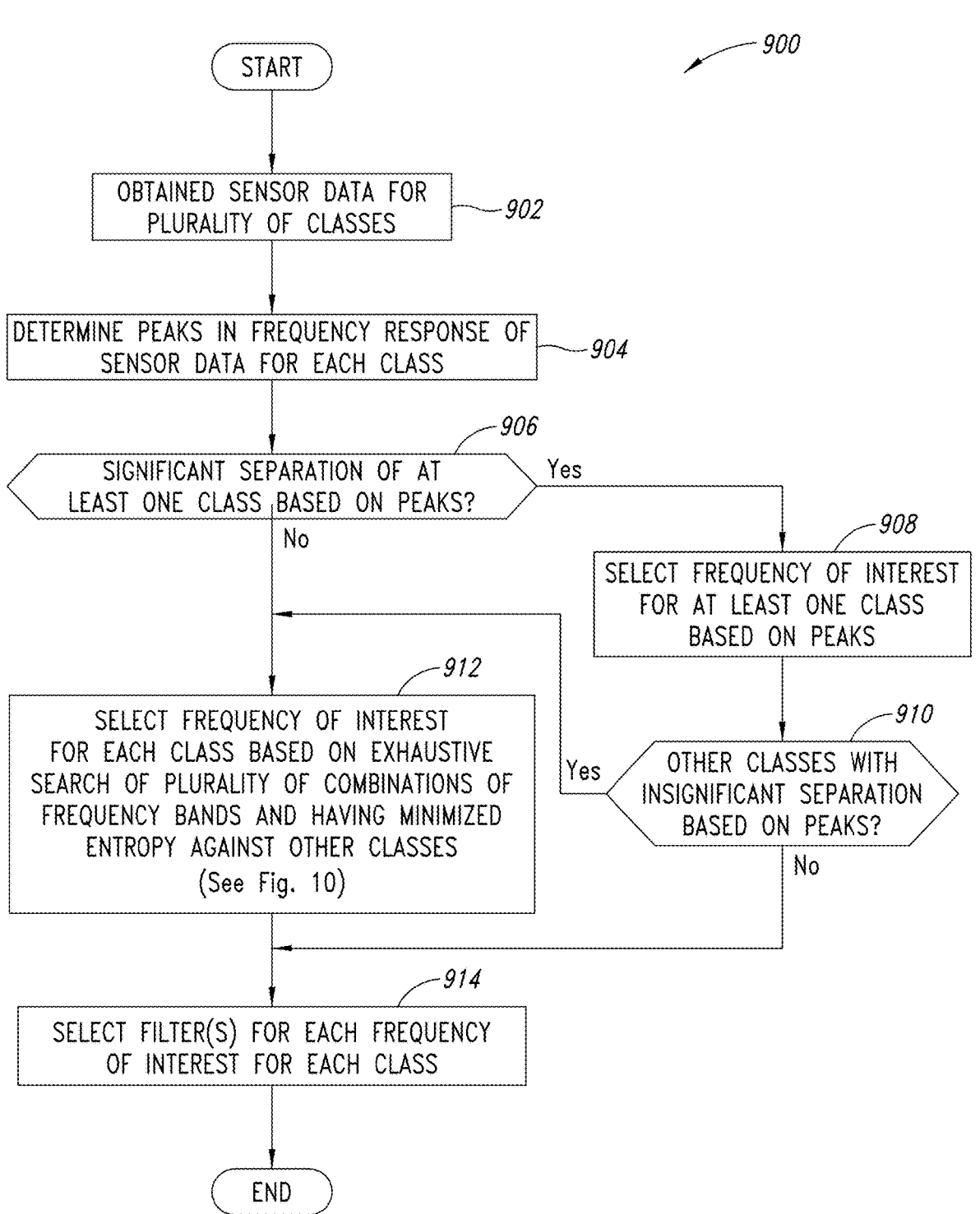
FIG. 9 shows a logical flow diagram of a process for automating filter selection in a decision tree in accordance with embodiments described herein.

FIG. 9 shows a logical flow diagram of a process 900 for automating filter selection in a decision tree in accordance with embodiments described herein.

Process 900 begins, after a start block, at block 902, where sensor data is obtained for a plurality of classes. In various embodiments, this sensor data is inertial data that is obtained from one or more inertial sensors. The sensor data is labeled for a particular class, such as a particular type of movement (e.g., walking, running, fast walking, biking, stationary, etc.). The label of the sensor data is the class associated with the sensor data, e.g., the type of movement that occurred when the sensor data was being captured.

Process 900 proceeds to block 904, where one or more dominant frequency peaks in the sensor data is determined for each class. In various embodiments, a frequency response is computed for all the classes from the sensor data. In at least one embodiment, a smoothing filter is applied to the frequency response of sensor data in order to smooth the response.

In various embodiments, the peaks are selected based on amplitude. For example, in some embodiments, each peak having an amplitude above a threshold value may be identified. In other embodiments, a threshold number (e.g., five) of the highest amplitude peaks may be identified.

Peak prominence and proximity with a nearest peak may be utilized to select a frequency region for each peak. The prominence is computed based on amplitude decay near the maximum amplitude of a peak. In at least one embodiment, a low frequency and a high frequency of a frequency range for a peak are selected based on the prominence, or amplitude decay from a peak, satisfying at least one threshold. If no peak is found for a particular class, then there may not be sufficient data or variation of the data to select a filter configuration, as described herein, for that class.

Process 900 continues at decision block 906, where a determination is made whether there is significant separation of at least one class from the other classes based on the determined peaks. In some embodiments, significant separation is determined based on two peaks from different classes having less than a threshold percentage of overlapping frequencies. In other embodiments, significant separation is determined when a range of a peak for a first class does not overlap a maximum amplitude of a peak for a second class.

For example, a first peak from a first class may be identified as being between 2.3 Hz and 2.6 Hz with a maximum amplitude at 2.45 Hz, a second peak from a second class may be identified as being between 1.1 Hz and 1.7 Hz with a maximum amplitude at 1.4 Hz, and a third peak from a third class may be identified as being between 2.4 Hz and 3.1 Hz with a maximum amplitude at 2.5 Hz. In this example, the second peak does not overlap with the first and third peaks, and thus has significant separation. Conversely, the first and third peaks have substantial overlap (e.g., more than a threshold percentage or the range of one peak overlaps the maximum amplitude of another peak), and thus do not have significant separation.

If there is significant peak separation for at least one class, then process 900 flows to block 908; otherwise, process 900 flows to block 912.

At block 908, one or more frequencies of interest is selected for the at least one class that has significant separation. The frequency of interest is a range of frequencies that can be denoted as [$f_s, f_e$] (frequency start to frequency end).

In various embodiments, the one or more selected frequencies of interest for a class may be the frequency ranges of the peaks determined at block 904 for that class. In other embodiments, the selected frequencies of interest may be the frequency range of the highest amplitude peaks (e.g., a select number of highest peaks) determined at block 904 for that class. In yet other embodiments, the selected frequencies of interest may be the frequency range of peaks that have the least amount of overlap with peaks of other classes (e.g., a selected number of least overlapping peaks).

Process 900 proceeds next to decision block 910, where a determination is made whether there are some other classes having insignificant separation based on peaks. In some situations, there may be significant separation between all classes based on the peaks. In this case, one or more frequencies of interest is selected at block 908 for each class and there are no other classes with insignificant separation based on peaks. If however, there are other classes that have insignificant separation with one another, then process 900 flows from decision block 910 to block 912; otherwise, process 900 flows to block 914.

If there are classes having insignificant separation based on peaks, as determined at decision block 906 or at decision block 910; then process 900 flows to block 912. In some embodiments, decision block 910 may not be performed and process 900 may flow from block 908 to block 912.

At block 912, one or more frequencies of interest are selected for each class based on an entropy process, which is described in more detail below in conjunction with FIG. 10 and elsewhere herein. Briefly, however, the entropy process exhaustively searches a plurality of combinations of frequency bands (e.g., all frequency bands associated with the sensor data) for frequency bands having a minimized entropy against other classes.

After block 912, or if, at decision block 910, there is no insignificant separation between classes based on peaks, process 900 flows to block 914. At block 914, one or more filters are selected for each frequency of interest for each class, which is described in more detail below in conjunction with FIG. 11. Briefly, however, every combination of filter for each frequency of interest across all classes is analyzed for optimal decision tree performance. Configuration data associated with the combination of filters that resulted in the optimal decision tree may be provided to the user device 108 to reconfigure the sensor 110.

After block 914, process 900 terminates or otherwise returns to a calling process to perform other actions.

Figure 10:
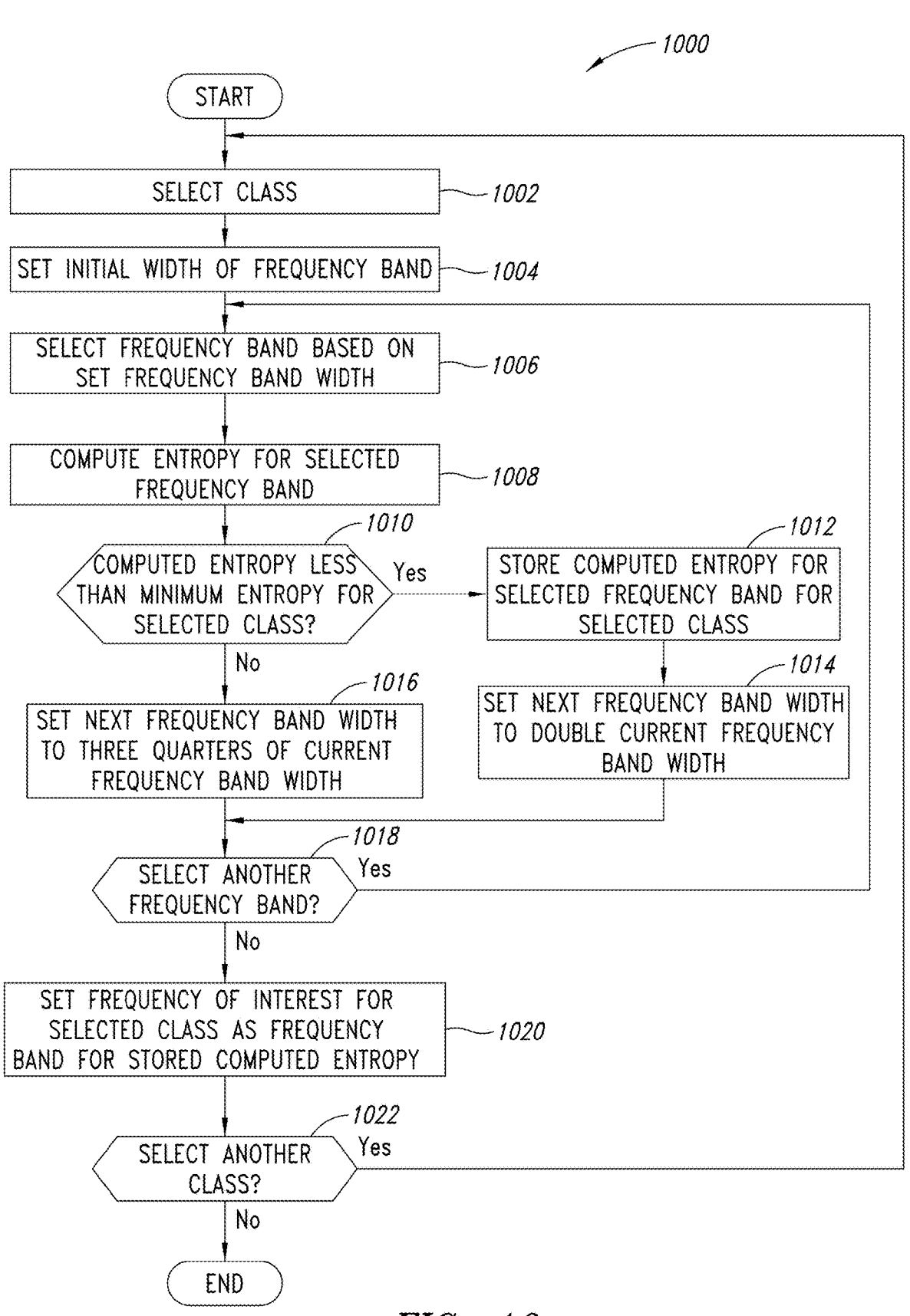
FIG. 10 shows a logical flow diagram of a process for selecting frequency of interest for a class using entropy in accordance with embodiments described herein.

FIG. 10 shows a logical flow diagram of a process 1000 for selecting frequency of interest for a class using entropy in accordance with embodiments described herein. As mentioned above, the entropy process exhaustively searches a plurality of combinations of frequency bands (e.g., all frequency bands) for frequency bands having a minimized entropy against other classes.

Process 1000 begins, after a start block, at block 1002, where a class is selected.

Process 1000 proceeds to block 1004, where an initial width of the frequency band is set. In some embodiments, the initial bandwidth may be set by an administrator, user, developer, or other person. In other embodiments, the initial bandwidth may be set based on the frequency response of the sensor data, such as a preselected percentage between a minimum and maximum frequency.

Process 1000 continues at block 1006, where a frequency band is selected based on the set frequency bandwidth. During an initial pass of process 1000, the selected frequency band may have a start at 0 Hz and an end at the bandwidth. During a next pass of process 1000, the selected frequency band may have a start at the previous frequency band end minus some overlapping frequency range and an end at the selected frequency band start plus the bandwidth.

Process 1000 proceeds next to block 1008, where entropy is computed on a signal after applying filter using the selected frequency band. In some embodiments, a band pass filter based on the selected frequency band is applied on the sensor data.

Process 1000 continues next at decision block 1010, where a determination is made whether the computed entropy is less than a minimum entropy for the selected class. If the computed entropy at block 1008 for the selected frequency band is less than a previously stored minimum entropy, then process 1000 flows to block 1012; otherwise, process 1000 flows to block 1016.

At block 1012, the computed entropy for the selected frequency is stored as the minimum entropy for the selected class.

Process 1000 continues next to block 1014, where a next frequency bandwidth is set. The next frequency bandwidth may be set to double the current frequency bandwidth. After block 1014, process 1000 flows to decision block 1018.

If at decision block 1010, the computed entropy is not less than the minimum entropy, then process 1000 flows from decision block 1010 to block 1016. At block 1016, the next frequency bandwidth is set to three-fourths of the current frequency bandwidth.

After the next frequency bandwidth is set at block 1014 or 1016, process 1000 continues at decision block 1018, where a determination is made whether to select another frequency band. In various embodiments, this determination is made based on the total frequency range for the sensor data and the current frequency band. Process 1000 iterates through each frequency band within the frequency range, given the dynamic bandwidth and amount of frequency overlap. Thus, another frequency band is selected until all frequency bands are analyzed.

If another frequency band is selected, process 1000 loops to block 1006 to select a next frequency band based on the frequency bandwidth set at block 1014 or 1016; otherwise, process 1000 flows to block 1020.

At block 1020, the frequency band associated with the stored minimum computed entropy is set as the frequency of interest for the selected class. In some embodiments, more than one frequency of interest may be selected. In at least one such embodiment, the plurality of frequencies of interest may be set as those frequency bands having the lowest entropy. For example, the three frequency bands having the three lowest computed entropy may be selected as frequencies of interest.

Process 1000 proceeds next to decision block 1022, where a determination is made whether to select another class. In various embodiments, process 1000 iterates across all classes. If another class is selected, process 1000 loops to block 1002; otherwise, process 1000 terminates or otherwise returns to a calling process to perform other actions.

Figure 11:
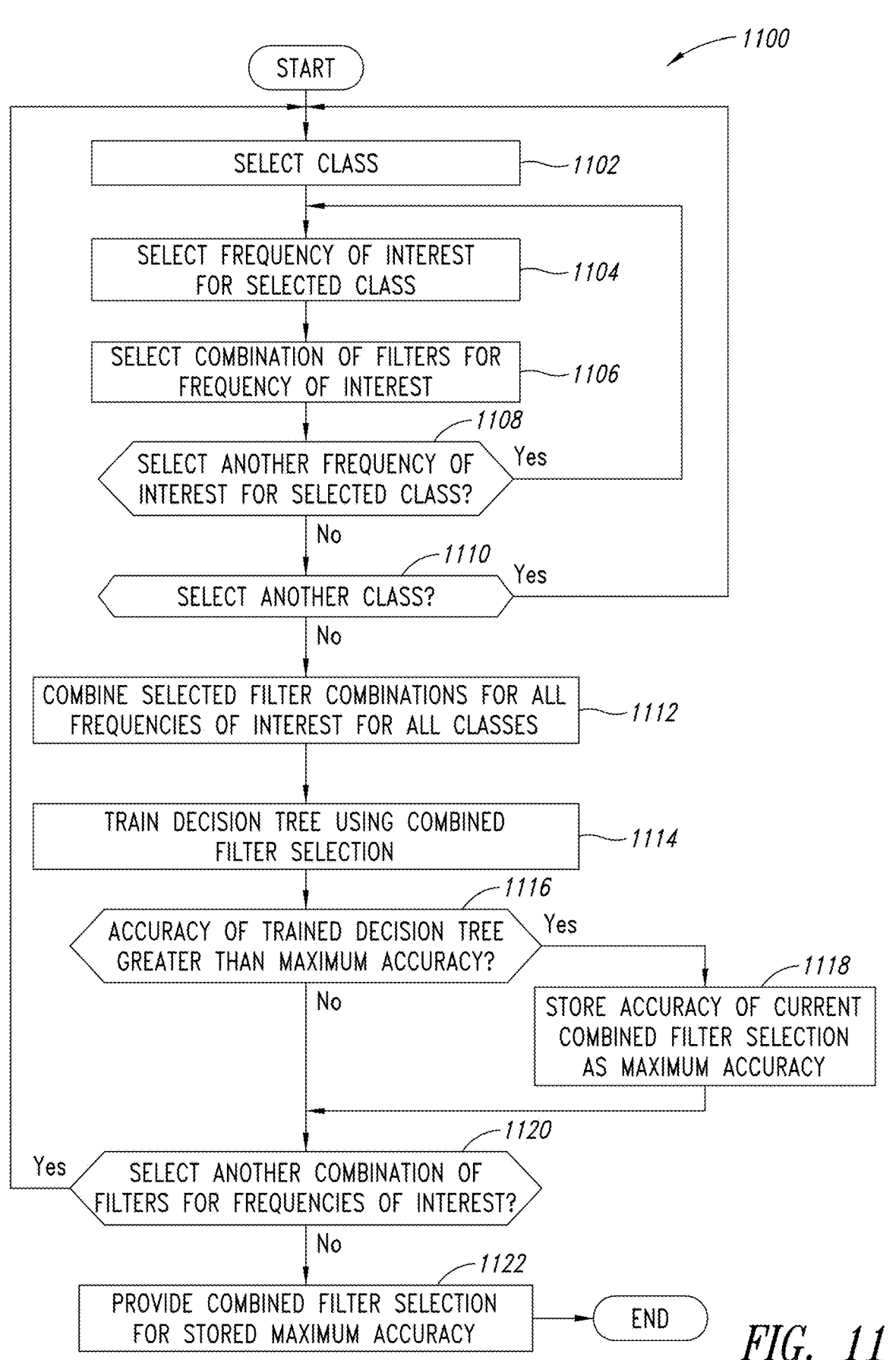
FIG. 11 shows a logical flow diagram of a process for selecting filters across frequencies of interest for multiple classes in accordance with embodiments described herein.

FIG. 11 shows a logical flow diagram of a process 1100 for selecting filters across frequencies of interest for multiple classes in accordance with embodiments described herein. In general, process 1100 iterates through each combination of filters for the frequencies of interest across all classes.

Process 1100 begins, after a start block, at block 1102, where a class is selected. Process 1100 proceeds to block 1104, where a frequency of interest is selected for the selected class. As described herein, one or more frequencies of interest are determined for each class, such as using the peaks method or entropy method described above, or a combination thereof.

Process 1100 continues at block 1106, where a combination of one or more filters is selected for the selected frequency of interest. As discussed above, a low pass filter, bandpass filter, highpass filter, or a combination filters may be selected. In some embodiments, a combination of different filters for different class or more of these filters may be selected. In various embodiments, the order in which filters are selected may be predefined such that each combination of one or a plurality of filters is selected as process 1100 iterates through each combination of frequency of interest with each combination of filters.

Process 1100 proceeds next to decision block 1108, where a determination is made whether another frequency of interest is selected. In various embodiments, this determination is based on whether other frequencies of interest were previously determined for the selected class. If another frequency of interest is to be selected, process 1100 loops to block 1104 to select another frequency of interest for the selected class, and then to select a combination of filters for that frequency of interest at block 1106; otherwise, process 1100 flows to decision block 1110.

At decision block 1110, a determination is made whether another class is selected. As mentioned above, process 1100 iterates through each combination of frequency of interest with each combination of filters for each class. If another class is to be selected, process 1100 loops to block 1102 to select another class, followed by selecting that class's frequencies of interest and the combination of filters at blocks 1104 and 1106; otherwise, process 1100 flows to block 1112.

At block 1112, the selected filter combinations for all frequencies of interest for all classes are combined.

Process 1100 proceeds next to block 1114, where a decision tree for a machine learning core sensor is trained using the combined filter selection. In the decision tree training, features of the selected filter combinations are computed and these features are used as attributes for decision tree training. The logic may use J48, CART or other optimization logic or algorithms to train the decision tree, which may output the accuracy of classifier and number of nodes. The decision tree's nodes represent the conditions of features meeting thresholds to split the data, which act as a decision.

Process 1100 continues next at decision block 1116, where a determination is made whether the accuracy of the trained decision tree is greater than a previously determined maximum accuracy. In various embodiments, the accuracy of the trained decision tree is determined based on the number of correct classification for a given labeled dataset. In other embodiments, the trained decision tree may be used to classify test sensor data, and its result compared to label data or ground truth to determine how accurate the trained decision tree is. If the accuracy of the trained decision tree is greater than the previous maximum accuracy; then process 1100 flows to block 1118; otherwise, process 1100 flows to decision block 1120.

At block 1118, the accuracy of the current combined filter selection is stored as the maximum accuracy. After block 1118, process 1100 flows to decision block 1120.

At decision block 1120, a determination is made whether to select another combination of filters for each frequency of interest across each class. If another combination of filters is to be selected, process 1100 loops to block 1102 to select a class, then select frequencies of interest and filters; otherwise, process 1100 flows to block 1122. As mentioned above, process 1100 iterates through each combination of filters for the frequencies of interest across all classes. Thus, process 1100 will continue to loop until all possible combinations of filters is assessed or until a termination command or condition is received or determined (e.g., if the accuracy exceeds a pre-selected threshold).

At block 1122, the combined filter selection for the stored maximum accuracy is provided to the machine learning core sensor. In some embodiments, the resulting decision tree is flashed to the memory of the sensor for use by the sensor in identifying a class for a new set of inertial sensor data.

After block 1122, process 1100 terminates or otherwise returns to a calling process to perform other actions.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a sensor configured to generate sensor data for a plurality of classes and including machine learning core with a classifier circuit;
a first circuit configured to, for each class:
receive the sensor data:
generate, for the corresponding class, frequency peak data including one or more frequency peaks having an amplitude higher than a threshold amplitude value;
generate, for each frequency peak of the frequency peak data, peak-based frequency range data indicating a peak-based frequency range of the frequency peak including a high frequency value of the frequency range and a low frequency value of the frequency range based on an amplitude decay threshold;
generate entropy-based frequency range data including one or more entropy-based frequency ranges based on whether an entropy value for each of a plurality of frequency ranges satisfies an entropy threshold;
a second circuit configured to:
receive the peak-based frequency range data and the entropy-based frequency range data for each of the plurality of classes;
select, for each class, one or more accepted frequency ranges from the peak-based frequency ranges and the entropy-based frequency ranges based on whether each peak-based frequency range and each entropy-based frequency range satisfies an overlap threshold with the other classes;
generate, for each of the plurality of classes, filter data for the one or more accepted frequencies of the class including one or more low pass filters, bandpass filters, or high pass filters for the one or more accepted frequencies;
generate combined filter data by combining the filter data for each of the plurality of classes, the combined filter data including, the one or more low pass filters, bandpass filters, or high pass filters of each class; and
generate decision tree data including a decision tree by training the decision tree with the combined filter data to select a class from among the plurality of classes for input sensor data based on features associated with the combined filter data, the one or more processors configured to upload the decision tree data to a machine learning core of the sensor, the sensor configured to generate test sensor data, and to output a classification of the test sensor data by processing the test sensor data with the decision tree data.

2. The system of claim 1 wherein the second circuit is configured to:
determine if a first peak-based frequency range for a first class in the plurality of classes overlaps a second peak-based frequency range for a second class in the plurality of classes; and
in response to the first peak-based frequency range satisfying the overlap threshold with the second peak-based frequency range:
set the first peak-based frequency range as a first frequency of interest for the first class; and
set the second peak-based frequency range as a second frequency of interest for the second class.

3. The system of claim 1 wherein the first circuit is configured to:
calculate the entropy value for all combinations of frequency bands in the sensor data for the corresponding class.

4. The system of claim 3 wherein the first circuit is configured to:
determine if the entropy value of a current frequency band is less than the entropy value of a previous frequency band;
in response to the entropy value of the current frequency band being less than the entropy value of the previous frequency band, set a width of a next frequency band to twice the width of the current frequency band; and
in response to the entropy value of the current frequency band being more than the entropy value of the previous frequency band, set a width of a next frequency band to three-fourths the width of the current frequency band.

5. The system of claim 1 wherein the second circuit is configured to:
test multiple combinations of filters for each frequency of interest for each of the plurality of classes based on the frequency data.

6. The system of claim 1 wherein the second circuit is configured to:
select a combination of one or more filters that maximizes accuracy of the decision tree based on the filter data.

7. The system of claim 1 wherein the second circuit is configured to:
select a frequency of interest for each of the plurality of classes that satisfies an overlap threshold of frequencies of interest for other classes.

8. A method, comprising:
generating, with a sensor including a machine learning core, sensor data for a plurality of classes;
for each corresponding class of the plurality of classes:
receiving, with a first circuit, the sensor data;
generating, with the first circuit for the corresponding class, frequency peak data identifying one or more frequency peaks having an amplitude higher than a threshold amplitude value;
generating, with the first circuit for each frequency peak of the frequency peak data, frequency range data indicating a frequency range of the frequency peak with a high frequency value of the frequency range and a low frequency value of the frequency range based on an amplitude decay threshold;
generating, with the first circuit, entropy-based frequency range data including one or more entropy-based frequency ranges based on whether an entropy value for each of a plurality of frequency ranges satisfies an entropy threshold;
receiving, with a second circuit peak-based frequency range data and the entropy-based frequency range data for each of the plurality of classes;
selecting, for each class with the second circuit, one or more accepted frequency ranges from the peak-based frequency ranges and the entropy-based frequency ranges based on whether each peak-based frequency range and each entropy-based frequency range satisfies an overlap threshold with the other classes;
generating, with the second circuit for each of the plurality of classes, filter data for the one or more accepted frequencies of the class including one or more low pass filters, bandpass filters, or high pass filters for the one or more accepted frequencies;
generating, with the second circuit, combined filter data by combing the filter data for each of the plurality of classes, the combined filter data including, the one or more low pass filters, bandpass filters, or high pass filters of each class; and generating, with the second circuit, decision tree data including a decision tree by training the decision tree with the combined filter data to select a class from among the plurality of classes for input sensor data based on signal features associated with the combined filter data;

transmitting the decision tree data to the machine learning core;

generating test sensor data with the sensor; and outputting a classification of the test sensor data based on the decision tree data.

9. The method of claim 8 wherein determining the at least one peak-based frequency range further comprises:

determining, by the at least one processor, if a first peak-based frequency range for a first class in the plurality of classes overlaps a second peak-based frequency range for a second class in the plurality of classes;

in response to the first peak-based frequency range satisfying the overlap threshold with the second peak-based frequency range:

setting the first peak-based frequency range as a first frequency of interest for the first class; and setting the second peak-based frequency range as a second frequency of interest for the second class.

10. The method of claim 8 further comprising:

calculating, with the first circuit, the entropy value for all combinations of frequency bands in the sensor data for the corresponding class.

11. The method of claim 10 wherein calculating the entropy value for all combinations of frequency bands in the sensor data for the corresponding class further comprises:

determining, with the first circuit, if the entropy value of a current frequency band is less than the entropy value of a previous frequency band;

in response to the entropy value of the current frequency band being less than the entropy value of the previous frequency band, setting, with the first circuit, a width of a next frequency band to twice the width of the current frequency band; and in response to the entropy value of the current frequency band being more than the entropy value of the previous frequency band, setting, with the first circuit, a width of a next frequency band to three-fourths the width of the current frequency band.

12. The method of claim 8 wherein generating the filter data for each accepted frequency for each of the plurality of classes further comprises:

testing with the second circuit, multiple combinations of filters for each frequency of interest for each of the plurality of classes.

13. The method of claim 8 wherein generating the filter data for each accepted frequency for each of the plurality of classes further comprises:

selecting, with the second circuit, the combination of one or more filters that maximizes accuracy of the decision tree.

14. A system, comprising:

a sensor configured to generate sensor data for a plurality of classes and including machine learning core with a classifier circuit;

a memory that stores computer instructions and labeled sensor data based on the sensor data and the plurality of classes; and one or more processors configured to execute the computer instructions and including:

a first circuit configured to receive the sensor data and for each class:

generate, for the corresponding class, frequency peak data including one or more frequency peaks having an amplitude higher than a threshold amplitude value;

generate, for each frequency peak of the frequency peak data, peak-based frequency range data indicating a peak-based frequency range of the frequency peak including a high frequency value of the frequency range and a low frequency value of the frequency range based on an amplitude decay threshold;

generate entropy-based frequency range data including one or more entropy-based frequency ranges based on whether an entropy value for each of a plurality of frequency ranges satisfies an entropy threshold;

a second circuit configured to:

receive the peak-based frequency range data and the entropy-based frequency range data for each of the plurality of classes;

select, for each class, one or more accepted frequency ranges from the peak-based frequency ranges and the entropy-based frequency ranges based on whether each peak-based frequency range and each entropy-based frequency range satisfies an overlap threshold with the other classes;

generate, for each of the plurality of classes, filter data for the one or more accepted frequencies of the class including one or more low pass filters, bandpass filters, or high pass filters for the one or more accepted frequencies of the class;

generate combined filter data by combining the filter data for each of the plurality of classes, the combined filter data including, the one or more low pass filters, bandpass filters, or high pass filters of each class; and generate decision tree data including a decision tree by training the decision tree with the combined filter data to select a class from among the plurality of classes for input sensor data based on the combined filter data, the one or more processors configured to upload the decision tree data to a machine learning core of the sensor, the sensor configured to generate test sensor data and to output a classification of the test sensor data by processing the test sensor data with the decision tree data.

15. The system of claim 14 wherein the second circuit is configured to:

determine if a first peak-based frequency range for a first class in the plurality of classes overlaps a second peak-based frequency range for a second class in the plurality of classes;

in response to the first peak-based frequency range satisfying a non-overlapping threshold with the second peak-based frequency range:

set the first peak-based frequency range as a first frequency of interest for the first class; and set the second peak-based frequency range as a second frequency of interest for the second class.

16. The system of claim 14 wherein first circuit is configured to:

calculate the entropy value for all combinations of frequency bands in the sensor data for the corresponding class.

17. The system of claim 16 wherein the first circuit is configured to:

determine if the entropy value of a current frequency band is less than the entropy value of a previous frequency band;

in response to the entropy value of the current frequency band being less than the entropy value of the previous frequency band, set a width of a next frequency band to twice the width of the current frequency band; and in response to the entropy value of the current frequency band being more than the entropy value of the previous frequency band, set a width of a next frequency band to three-fourths the width of the current frequency band.

18. The system of claim 14 wherein the second circuit is configured to:

test multiple combinations of filters for each frequency of interest for each of the plurality of classes.

19. The system of claim 14 wherein second circuit is configured to:

select a combination of one or more filters that maximizes accuracy of the decision tree.

20. The system of claim 14 wherein second circuit is configured to:

download settings for a combination of one or more filters into the sensor with a machine learning core based on the filter data.

21. The system of claim 14 wherein the second circuit is configured to:

store the trained decision tree onto the sensor with the machine learning core.

\* \* \* \* \*